United States Patent
Colbert et al.

(10) Patent No.: US 12,277,001 B2
(45) Date of Patent: Apr. 15, 2025

(54) AUTOMATED DATA-DRIVEN SYSTEM TO OPTIMIZE OVERCLOCKING

(71) Applicants: ADVANCED MICRO DEVICES, INC., Santa Clara, CA (US); ATI TECHNOLOGIES ULC, Markham (CA)

(72) Inventors: Ian Charles Colbert, San Diego, CA (US); Alexander Sabino Duenas, Markham (CA); Stephen Jiacheng Fu, Richmond Hill (CA); Omer Irshad, Markham (CA); Mohammad Hamed Mousazadeh, Markham (CA); Ihab Amer, Markham (CA); Gabor Sines, Markham (CA)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 59 days.

(21) Appl. No.: 18/126,166

(22) Filed: Mar. 24, 2023

(65) Prior Publication Data

US 2024/0319760 A1   Sep. 26, 2024

(51) Int. Cl.
*G06F 1/08*    (2006.01)
*G06F 1/26*    (2006.01)

(52) U.S. Cl.
CPC . *G06F 1/08* (2013.01); *G06F 1/26* (2013.01)

(58) Field of Classification Search
CPC .............. G06F 1/08; G06F 1/26; G06N 20/00
See application file for complete search history.

(56) References Cited

U.S. PATENT DOCUMENTS

| | | | |
|---|---|---|---|
| 6,622,254 B1 * | 9/2003 | Kao | G06F 1/04 713/600 |
| 2009/0235108 A1 * | 9/2009 | Gold | G06F 1/324 713/500 |
| 2009/0259876 A1 * | 10/2009 | Chang | G06F 1/08 713/600 |
| 2014/0136823 A1 * | 5/2014 | Ragland | G06F 9/44505 713/1 |
| 2017/0262354 A1 * | 9/2017 | Han | G06F 11/3024 |
| 2019/0369656 A1 * | 12/2019 | Han | G06F 9/4403 |
| 2021/0109562 A1 * | 4/2021 | Ragland | G06F 1/206 |
| 2021/0326232 A1 * | 10/2021 | Partiwala | G06F 11/3428 |
| 2021/0365269 A1 * | 11/2021 | Han | G06F 11/24 |
| 2021/0405112 A1 * | 12/2021 | Partiwala | G06F 11/3024 |
| 2022/0113757 A1 * | 4/2022 | Yan | G06F 1/3243 |
| 2023/0350696 A1 * | 11/2023 | Harwani | G06F 1/206 |
| 2024/0220108 A1 * | 7/2024 | Joshi | G06F 3/061 |
| 2024/0231415 A1 * | 7/2024 | Jiang | H04B 17/364 |

FOREIGN PATENT DOCUMENTS

WO    WO-2023191785 A1 *   10/2023

* cited by examiner

*Primary Examiner* — Glenn A. Auve

(57) ABSTRACT

A processing device includes an automated overclocking system and a processor. The automated overclocking system is data-driven and includes an inference engine that executes a machine learning model configured to generate a first output based on a current configuration of the processing device. The first output includes a first set of overclocking parameters. The processor is configured to adjust one or more operating characteristics of at least one component of the processing device based on the first set of overclocking parameters.

20 Claims, 7 Drawing Sheets

AUTOMATED DATA-DRIVEN SYSTEM TO OPTIMIZE OVERCLOCKING

BACKGROUND

Overclocking allows the operating speed of a processing unit, such as a central processing unit (CPU) or a graphics processing unit (GPU), to be increased. For example, a manufacturer typically establishes a default clock rate for a processing unit based on the processing unit's physical limitations. This standard clock rate provides a consistent time period used throughout the processing unit and determines the rate that operations are performed. The clock rate of the processing unit can be increased, i.e., overclocked, beyond the standard clock rate to increase the processing unit's performance. The processing unit's operating voltage can also be increased as part of the overclocking process to maintain operational stability at accelerated speeds. Although overclocking has the benefit of increased performance, the risk of the processing unit becoming unreliable or failing also increases.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
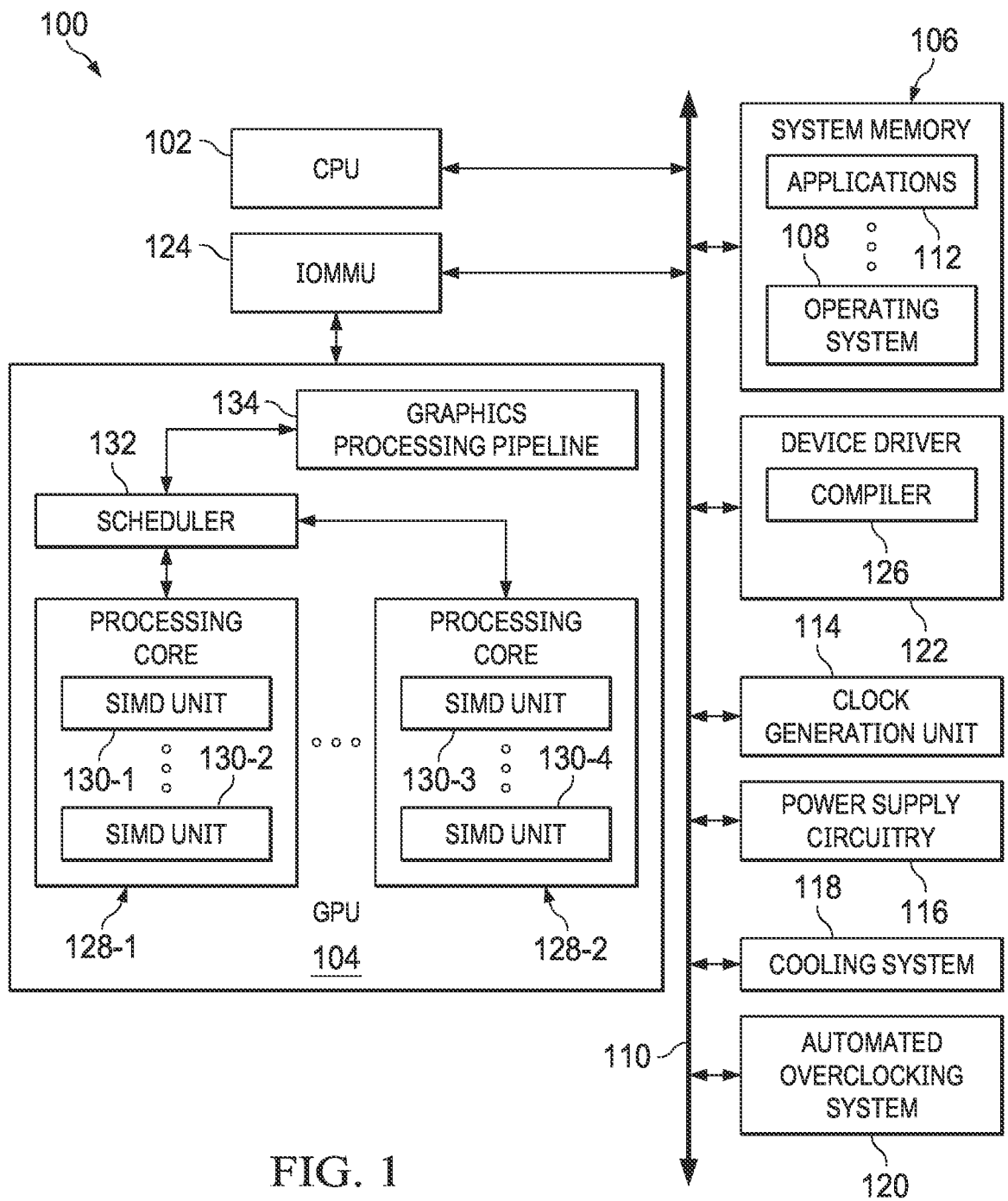
FIG. 1 is a block diagram of a processing device in accordance with some implementations.

Overclocking of a processing unit, such as a CPU or a GPU, typically involves increasing the processing unit's standard clock rate. The operating voltage of the processing unit can also be increased to provide stability while operating at the resulting higher clock rate. End-users generally have two options for overclocking a processing unit, manual overclocking and automated overclocking. In manual overclocking, the user provides specified overclocking parameters, such as clock rate/frequency and voltage settings. However, as the user-specified parameters may be too aggressive for the processing unit, manual overclocking often increases the risk of thermal/power throttling, system instability, or system failures including timeout detection and recovery (TDR) events, kernel-level failures, hard/soft hangs, system shutdowns, and the like.

In automated overclocking, a heuristic approach based on trial-and-error is typically used to determine a set of conservative parameters that are provided to the user. For example, a suite of pre-defined light workloads are executed in the background and the overclocking ceiling is iteratively increased until a failure is reached, at which point the trial-and-error process reverts to the last stable overclocking ceiling. However, the trial-and-error approach is time intensive, and iteratively increasing the overclocking ceiling until reaching a failure can result in TDR events or system crashes, which leads to a poor user experience. Also, the algorithm(s) implemented by the heuristic approach typically provides a very conservative estimate for a safe overclocking ceiling, and does not generate an optimal set for real world workloads when overclocking is enabled. If the workload used to determine the setting is not comprehensive enough, this may yield a "false" sense of security with high clocks, while a different workload that touches this critical path will cause an issue. In such scenarios, the end user will not be able to achieve the maximum performance (e.g., high frame rates) in some real-world workloads. Moreover, the resulting overclocking ceiling is determined once and set for all workloads so that, for a given machine, each workload is subject to the same overclocking ceiling (i.e., a "static ceiling"). Stated differently, the overlocking settings determined by most automated overlocking processes are global and usually cannot be fine-tuned for a specific workload, including run-time conditions such as temperature.

Accordingly, the present disclosure describes implementations of systems and methods for automated data-driven optimization of overclocking that address the problems detailed above associated with manual and automated overclocking. In at least some implementations, an automated overclocking system implements one or more techniques to select the optimal overclocking ceiling for each user system (client) using a data-driven model. Unlike other automated overclocking approaches that are based on trial-and-error, the automated overclocking system described herein offers an improved user experience by minimizing the risk of system crashes and instabilities. For example, the overclocking parameters determined by the automated overclocking system are not pre-defined. Instead, the overclocking parameters are adapted to the end user's specifications and dynamically adjusted based on the workloads. The dynamic overclocking ceiling provided by the automated overclocking system is advantageous for the current moment-in-time state/configuration of the user system since the ceiling can account for influential real-time parameters, such as temperature.

In at least some implementations, the data-driven model is trained on different user system configurations and workload characteristics such that optimal overclocking settings/parameters are predicted using information aggregated across system configurations and workload characteristics. Stated differently, the automated overclocking system is able to determine optimal overclocking parameters for multiple user systems even if their system configurations and workload characteristics differ from each other. In at least some implementations, the overclocking parameters determined for a specified user system are optimized with respect to stability, power, performance, performance-per-watt, a combination thereof, or the like, which provides an improved user experience by avoiding (or at least minimizing) TDRs, system instabilities, and system crashes while setting the clocks.

The techniques described herein for data-driven optimization of automated overlocking, are, in different implementations, employed at any of a variety of devices that include components (e.g., CPUs, GPUs, accelerated processing units (APUs), processor cores, compute units, and the like) capable of being overclocked. FIG. 1 is a block diagram of one such example device 100 (also referred to herein as processing device 100) according to some implementations. It is noted that the number of components of the processing device 100 varies from implementation to implementation. In at least some implementations, there is more or fewer of each component/subcomponent than the number shown in FIG. 1. It is also noted that the processing device 100, in at least some implementations, includes other components not shown in FIG. 1. Additionally, in other implementations, the processing device 100 is structured in other ways than shown in FIG. 1. Also, components of the processing device 100 are implemented as hardware, circuitry, firmware, software, or any combination thereof. In some implementations, the processing device 100 includes one or more software, hardware, circuitry, and firmware components in addition to or different from those shown in FIG. 1.

In at least some implementations, the processing device 100 includes, for example, a computer, a gaming device, a server, a handheld device, a set-top box, a television, a mobile phone, a tablet computer, a wearable computing device, or the like. The processing device 100, in at least some implementations, includes one or more central processing units (CPU) 102 and one or more accelerated processing units (APUs), such as a graphics processing unit (GPU) 104. Other examples of an APU include any of a variety of parallel processors, vector processors, coprocessors, general-purpose GPUs (GPGPUs), non-scalar processors, highly parallel processors, artificial intelligence (AI) processors, inference engines, machine learning processors, other multithreaded processing units, scalar processors, serial processors, or any combination thereof. The CPU 102, in at least some implementations, includes one or more single-core or multi-core CPUs. In various implementations, the GPU 104 includes any cooperating collection of hardware and or software that perform functions and computations associated with accelerating graphics processing tasks, data-parallel tasks, nested data-parallel tasks in an accelerated manner with respect to resources such as conventional CPUs, conventional graphics processing units (GPUs), and combinations thereof.

In the implementation of FIG. 1, the CPU 102 and the GPU 104 are formed and combined on a single silicon die or package to provide a unified programming and execution environment. This environment enables the GPU 104 to be used as fluidly as the CPU 102 for some programming tasks. In other implementations, the CPU 102 and the GPU 104 are formed separately and mounted on the same or different substrates. It should be appreciated that processing device 100, in at least some implementations, includes more or fewer components than illustrated in FIG. 1. For example, the processing device 100, in at least some implementations, additionally includes one or more input interfaces, non-volatile storage, one or more output interfaces, network interfaces, and one or more displays or display interfaces.

As illustrated in FIG. 1, the processing device 100 also includes a system memory 106, an operating system (OS) 108, a communications infrastructure 110, one or more applications 112, a clock generation unit 114, power supply circuitry 116, and a cooling system, 118. Access to system memory 106 is managed by a memory controller (not shown) coupled to system memory 106. For example, requests from the CPU 102 or other devices for reading from or for writing to system memory 106 are managed by the memory controller. In some implementations, the one or more applications 112 include various programs or commands to perform computations that are also executed at the CPU 102. The CPU 102 sends selected commands for processing at the GPU 104. The operating system 108 and the communications infrastructure 1010 are discussed in greater detail below.

Within the processing device 100, the system memory 106 includes non-persistent memory, such as dynamic random-access memory (not shown). In various implementations, the system memory 106 stores processing logic instructions, constant values, variable values during execution of portions of applications or other processing logic, or other desired information. For example, in various implementations, parts of control logic to perform one or more operations on CPU 102 reside within system memory 106 during execution of the respective portions of the operation by CPU 102. During execution, respective applications, operating system functions, processing logic commands, and system software reside in system memory 106. Control logic commands that are fundamental to operating system 108 generally reside in system memory 106 during execution. In some implementations, other software commands (e.g., a set of instructions or commands used to implement a device driver 122) also reside in system memory 106 during execution of processing device 100.

The clock generation unit 114, in at least some implementations, includes one or more timing devices used to control the clock frequency sent to various components of processing device 100. In one example, the clock generation unit 114 is capable of generating different frequencies for different groups of components in, including generating different (independent) frequencies for the various "cores" of the CPU 102, the APU, 104, a combination thereof, or the like. The power supply circuitry 116 supplies power (i.e., voltage) to the various components of the processing device 100. The cooling system 118 is coupled to the CPU 102, the GPU 104, a combination thereof, or the like. When present, the cooling system 118 is used to control the temperature(s) of the CPU 102, the GPU 104, and the like. In at least some implementations, the cooling system 118 includes one or more fans for circulating and exhausting air, a liquid circulating system, a combination thereof, or the like. The cooling system 118 regulates, in at least some implementations, regulates only for one or more of the CPU 102 or GPU 104, while in other implementations, the cooling system 118 regulates temperatures for the entire processing device 100.

The input-output memory management unit (IOMMU) 124 is a multi-context memory management unit. As used herein, context is considered the environment within which the kernels execute and the domain in which synchronization and memory management is defined. The context includes a set of devices, the memory accessible to those devices, the corresponding memory properties, and one or more command-queues used to schedule execution of a kernel(s) or operations on memory objects. The IOMMU 124 includes logic to perform virtual to physical address translation for memory page access for devices, such as the GPU 104. In some implementations, the IOMMU 124 also includes, or has access to, a translation lookaside buffer (TLB) (not shown). The TLB is implemented in a content addressable memory (CAM) to accelerate translation of logical (i.e., virtual) memory addresses to physical memory addresses for requests made by the GPU 104 for data in system memory 106.

In various implementations, the communications infrastructure 110 interconnects the components of the processing device 100. Communications infrastructure 110 includes (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. In some implementations, communications infrastructure 110 also includes an Ethernet network or any other suitable physical communications infrastructure that satisfies an application's data transfer rate requirements. Communications infrastructure 110 also includes the functionality to interconnect components, including components of the processing device 100.

A driver, such as device driver 122, communicates with a device (e.g., GPU 104) through an interconnect or the communications infrastructure 110. When a calling program invokes a routine in the device driver 122, the device driver 122 issues commands to the device. Once the device sends data back to the device driver 122, the device driver 122 invokes routines in an original calling program. In general, device drivers are hardware-dependent and operating-system-specific to provide interrupt handling required for any necessary asynchronous time-dependent hardware interface. In some implementations, a compiler 126 is embedded within device driver 122. The compiler 126 compiles source code into program instructions as needed for execution by the processing device 100. During such compilation, the compiler 126 applies transforms to program instructions at various phases of compilation. In other implementations, the compiler 126 is a standalone application. In various implementations, the device driver 122 controls operation of the GPU 104 by, for example, providing an application programming interface (API) to software (e.g., applications 112) executing at the CPU 102 to access various functionality of the GPU 104.

The CPU 102 includes (not shown) one or more of a control processor, field-programmable gate array (FPGA), application-specific integrated circuit (ASIC), or digital signal processor (DSP). The CPU 102 executes at least a portion of the control logic that controls the operation of the processing device 100. For example, in various implementations, the CPU 102 executes the operating system 108, the one or more applications 112, and the device driver 122. In some implementations, the CPU 102 initiates and controls the execution of the one or more applications 112 by distributing the processing associated with one or more applications 112 across the CPU 102 and other processing resources, such as the GPU 104.

The GPU 104 executes commands and programs for selected functions, such as graphics operations and other operations that are particularly suited for parallel processing. In general, GPU 104 is frequently used for executing graphics pipeline operations, such as pixel operations, geometric computations, and rendering an image to a display. In some implementations, GPU 104 also executes compute processing operations (e.g., those operations unrelated to graphics such as video operations, physics simulations, computational fluid dynamics, etc.), based on commands or instructions received from the CPU 102. For example, such commands include special instructions that are not typically defined in the instruction set architecture (ISA) of the GPU 104. In some implementations, the GPU 104 receives an image geometry representing a graphics image, along with one or more commands or instructions for rendering and displaying the image. In various implementations, the image geometry corresponds to a representation of a two-dimensional (2D) or three-dimensional (3D) computerized graphics image.

In various implementations, the GPU 104 includes one or more compute units, such as one or more processing cores 128 (illustrated as 128-1 and 128-2) that include one or more single-instruction multiple-data (SIMD) units 130 (illustrated as 130-1 to 130-4) that are each configured to execute a thread concurrently with execution of other threads in a wavefront by other SIMD units 130, e.g., according to a SIMD execution model. The SIMD execution model is one in which multiple processing elements share a single program control flow unit and program counter and thus execute the same program but are able to execute that program with different data. The processing cores 128 are also referred to as shader cores or streaming multi-processors (SMXs). The number of processing cores 128 implemented in the GPU 104 is configurable. Each processing core 128 includes one or more processing elements such as scalar and or vector floating-point units, arithmetic and logic units (ALUs), and the like. In various implementations, the processing cores 128 also include special-purpose processing units (not shown), such as inverse-square root units and sine/cosine units.

Each of the one or more processing cores 128 executes a respective instantiation of a particular work item to process incoming data, where the basic unit of execution in the one or more processing cores 128 is a work item (e.g., a thread). Each work item represents a single instantiation of, for example, a collection of parallel executions of a kernel invoked on a device by a command that is to be executed in parallel. A work item executes at one or more processing elements as part of a workgroup executing at a processing core 128.

The GPU 104 issues and executes work-items, such as groups of threads executed simultaneously as a "wavefront", on a single SIMD unit 130. Wavefronts, in at least some implementations, are interchangeably referred to as warps, vectors, or threads. In some implementations, wavefronts include instances of parallel execution of a shader program, where each wavefront includes multiple work items that execute simultaneously on a single SIMD unit 130 in line with the SIMD paradigm (e.g., one instruction control unit executing the same stream of instructions with multiple data). A scheduler 132 is configured to perform operations related to scheduling various wavefronts on different processing cores 128 and SIMD units 130 and performing other operations to orchestrate various tasks on the GPU 104.

To reduce latency associated with off-chip memory access, various GPU architectures include a memory cache hierarchy (not shown) including, for example, L1 cache and a local data share (LDS). The LDS is a high-speed, low-latency memory private to each processing core 128. In some implementations, the LDS is a full gather/scatter model so that a workgroup writes anywhere in an allocated space.

The parallelism afforded by the one or more processing cores 128 is suitable for graphics-related operations such as pixel value calculations, vertex transformations, tessellation, geometry shading operations, and other graphics operations. A graphics processing pipeline 134 accepts graphics processing commands from the CPU 102 and thus provides computation tasks to the one or more processing cores 128 for execution in parallel. Some graphics pipeline operations, such as pixel processing and other parallel computation operations, require that the same command stream or compute kernel be performed on streams or collections of input data elements. Respective instantiations of the same compute kernel are executed concurrently on multiple SIMD units 130 in the one or more processing cores 128 to process such data elements in parallel. As referred to herein, for example, a compute kernel is a function containing instructions declared in a program and executed on an accelerated processing device (APD) processing core 128. This function is also referred to as a kernel, a shader, a shader program, or a program.

In at least some implementations, the processing device 100 further includes an automated overclocking (OC) system 120. It should be understood that although FIG. 1 shows the automated OC system 120 as being implemented as a standalone component of the processing device 100, in at least some implementations, the automated OC system 120 is implemented by one or more of the processing units, such as the CPU 102 or the GPU 104, or is comprised of one or more one or more components of the processing device 100, such as those shown in FIG. 3. As described in greater detail below, the automated OC system 120 performs data-driven overclocking that is optimized for a current stat (e.g., configuration) of the processing device 100. The automated OC system 120 determines, using a data-driven model, overclocking parameters that are adapted to the configuration of the processing device 100 and also dynamically adjusted based on the workloads of the processing device 100.

Figure 2:
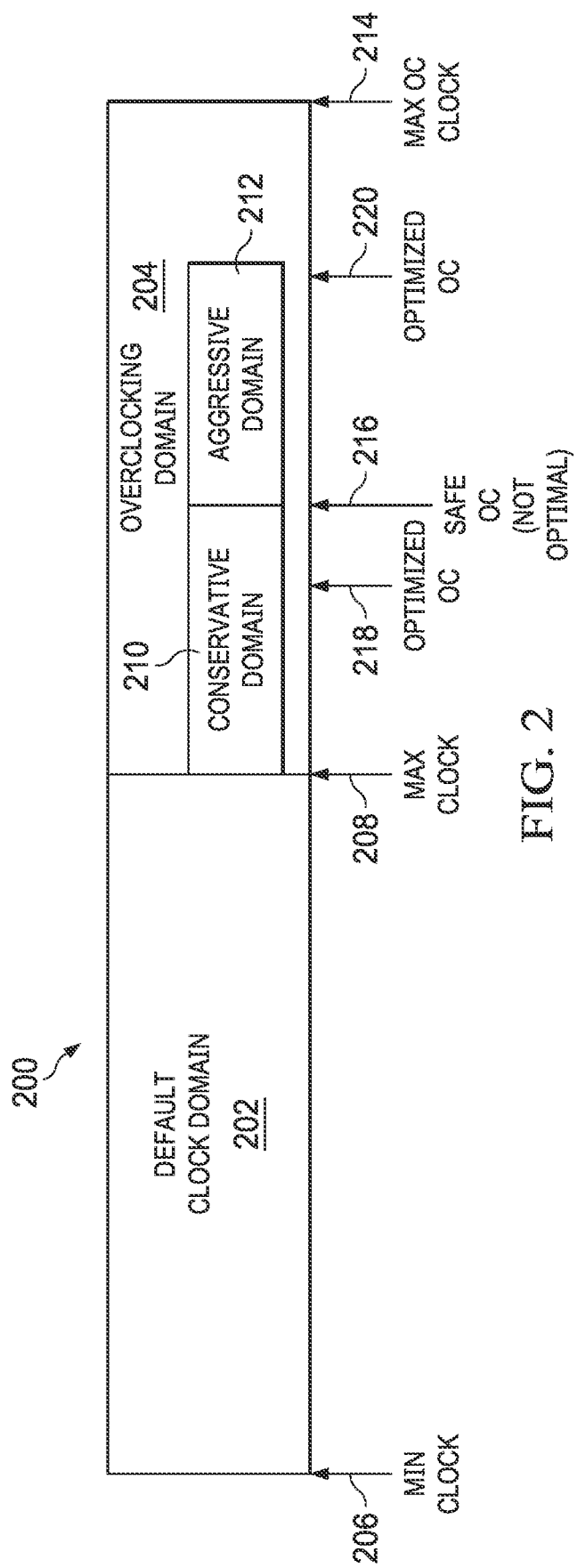
FIG. 2 is a diagram illustrating a default clock domain and an overclocking domain of a processing system in accordance with some implementations.

For example, FIG. 2 shows an example of a clock domain 200, which includes a default clock domain 202 and a overclocking domain 204. The default clock domain 202 includes minimum default clock rate 206 and a maximum default clock rate 208 for a component (e.g., CPU 102, GPU 104, or memory 106) of the processing device 100 set by the manufacturer. The overclocking domain 204 includes clock rates that are above the default clock rates set by the manufacturer. A conservative overclocking domain 210 applies overclocking parameters that improve performance of the component being overclocked with less risk of system instability and failure, whereas an aggressive overclocking domain 212 applies overclocking parameters that improve the performance of the component over the conservative overclocking domain 210 but also increases the risk of system instability and failure. However, the conservative overclocking domain 210 and the aggressive overclocking domain 212 usually apply a clock rate that is under a maximum overclocked clock rate 214. As described above, conventional automated overlocking mechanisms typically identify the maximum "safe" overclocking ceiling 216 at the border of the conservative overclocking domain 210 and the aggressive overclocking domain 212. However, although this ceiling 216 is safe (i.e., less risk of system instability and failure), it is not necessarily optimal for the device. In contrast, the automated overclocking system 120 described herein provides a user with the option of selecting either the conservative overclocking domain 210 or the aggressive overclocking domain 212 and uses one or more data-driven models to optimize the target overclocking ceiling (e.g., optimized conservative OC ceiling 218 or optimized aggressive OC ceiling 220) according to the configuration of the processing device 100 and the current workloads of the processing device 100. In at least some implementations, the overclocking parameters are also optimized with respect to stability, power, performance, performance-per-watt, a combination thereof, or the like. The automated OC system 120, in at least some implementations, applies the optimized overclocking parameters to, for example, adjust the clock rate supplied by the clock generation unit 114 to one or more components (e.g., CPU 102, GPU 104, or memory 106) of the processing device 100, adjust power budgets and the power supplied by the power supply circuitry 116, adjust the cooling settings (also referred to herein as thermal management settings) of the cooling system 118, adjust memory settings, a combination thereof, or the like.

Figure 3:
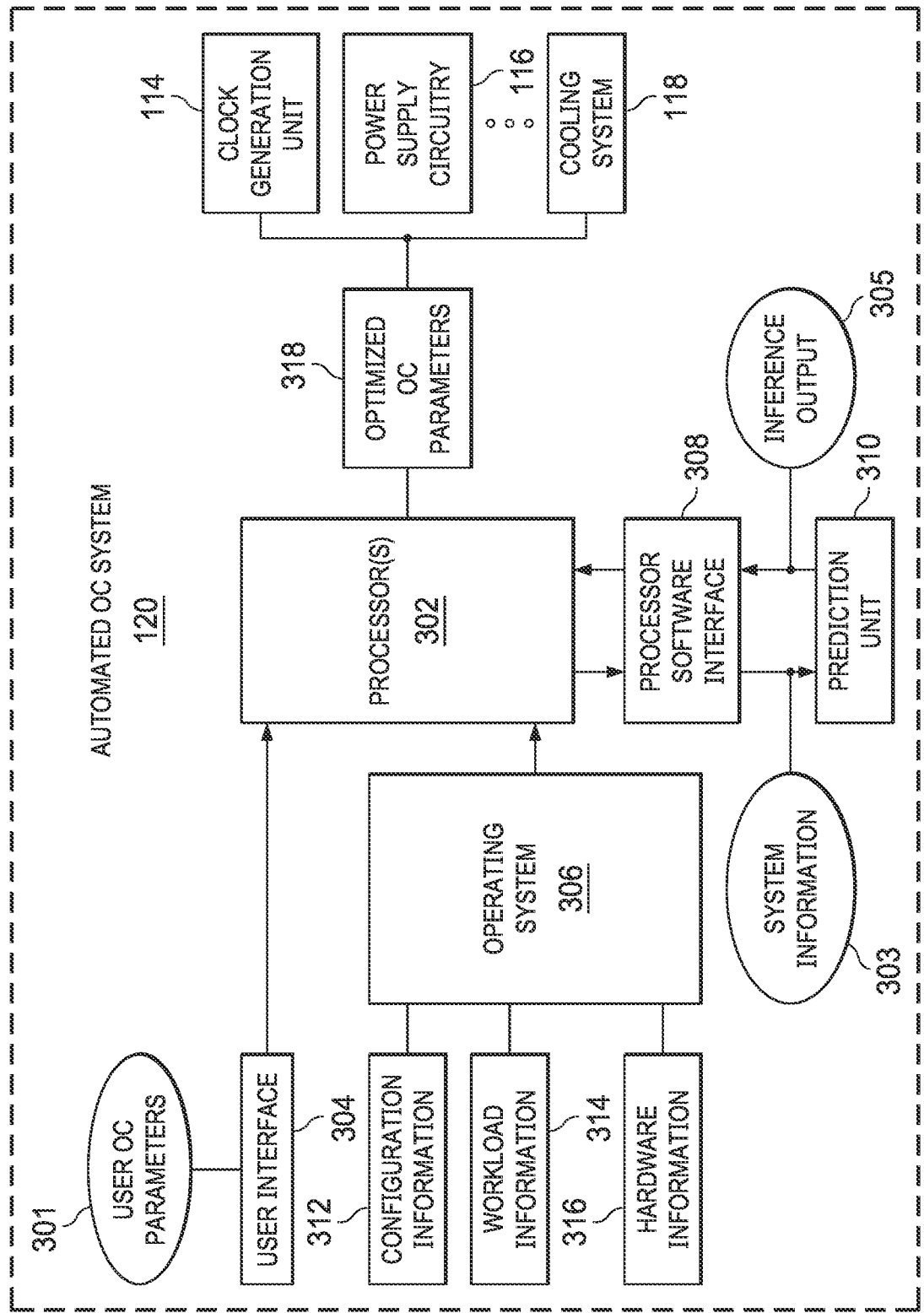
FIG. 3 is a block diagram of an automated overclocking system in accordance with some implementations.

FIG. 3 is a block diagram illustrating one example of a high-level overview of the automated OC system 120. In this example, the automated OC system 120 includes at least one processor 302 (e.g., one or more of the CPU 102 or GPU 104 of FIG. 1, APUs, or any other processing or coprocessing units with overclocking capabilities), a user interface 304, an operating system 306 (e.g., the OS 108 of FIG. 1), a processor software interface 308, and a prediction unit 310. In at least some implementations, the user interface 304 is a graphical or non-graphical user interface presented to the user of the processing device 100 that presents various options to the user associated with the overclocking process performed by the automated OC system 120. Stated differently, the user interface 304 allows the user to interact with the automated OC system 120. The user enables, disables, and fine tunes the overclocking of one or more device components by providing user-specified OC parameters 301 through the user interface 304. For example, the user selects a conservative overclocking domain option or an aggressive overclocking domain option presented in the user interface 304. The conservative overclocking domain option configures the automated OC system 120 to provide optimized overclocking ceiling 218 within the conservative overclocking domain 210, whereas the aggressive overclocking domain option configures the automated OC system 120 to provide an optimized overclocking ceiling 220 within the aggressive overclocking domain 212. As such, the user is able to choose to have more conservative overlocking parameters applied to the device component(s) for less intense workloads or have more aggressive overlocking parameters applied for more intense workloads, thereby allowing the user to balance the risk of system failures or instability with potential performance gains. In at least some implementations, the user-specified OC parameters 301 indicate additional user overclocking preferences, such as optimizing the performance-per-watt of the processing device 100.

In at least some implementations, the OS 306 (or another component) obtains input, such as system information 303, to be used by the automated OC system 120 for determining optimized parameters for overclocking one or more components of the processing device 100. The system information 303, in at least some implementations includes static macro-level features that are relatively static and are not influenced by applications executing on the processing device 100. Examples of the system information 303 include one or more of system-related configurations 312, workload characteristics 314, hardware specifications 316. The system-related configurations 312 include configuration information related to the CPU 102 and the GPU 104 (e.g., the current clock rate, the current supplied power (e.g., voltage), and the like), the system memory 106, the current display settings, the graphics and display capabilities, chipset information, the current system temperature, the current power settings, the current settings of the cooling system 118, the capabilities of the cooling system 118, a combination thereof, or any other relevant information that can be used as input to (or output from) the prediction unit 310 described below. The workload characteristics 314 include any information related to the current or expected workload of the processing device 100, such as current processing/compute unit (e.g., CPU, GPU, processing core, etc.) utilization, user mode driver information, types of application currently executing or installed on the processing device 100, and the like. The workload characteristics 314, in at least some implementations, are used as input to the prediction unit 310 for fine-tuning the overclocking optimization process based on real world use cases. The hardware specifications 316 include information such as CPU/GPU model information, overclocking support, core count, base clock speed, thermal design power (TPD), and other specification and capability information.

The processor software interface 308, in at least some implementations, refers to drivers, such as kernel mode, user mode, and firmware components, as well as software development kit (SDK) libraries. The processor software interface 308 collects and passes system information 303 (e.g., the system-related configurations 312, workload characteristics 314, hardware specifications 316, and the like), to the prediction unit 310, and receives the resulting output 305 generated by the prediction unit 310.

The prediction unit 310 is a data-driven prediction unit that is artificially intelligent and capable of performing machine learning tasks. In at least some implementations, the prediction unit 310 is implemented separate from or as part of the processor 302 as hardware, separate fixed-function circuitry, firmware, software operating on the processor 302 or another processor, or any combination thereof. The prediction unit 310 receives the system information 303 from the processor software interface 308 and, in at least some implementations, also receives the user-specified OC parameters 301. As described below, the prediction unit 310 uses the system information 303 to find a set of overclocking parameters/settings 318 (e.g., clocks, power budget, cooling system settings, a combination thereof, or the like) that are selected and optimized for the processing device 100. The prediction unit 310 passes an inference output 305 including the optimized overclocking parameters 318 to the processor software interface 308. The processor software interface 308 then interacts with the processor 302 to apply the optimized overclocking parameters 318. Stated differently, the processor software interface 308 interacts with the processor 302 to adjust one or more operating characteristics (e.g., clock rate, power/voltage, cooling, or the like) of at least one component (e.g., CPU 102, GPU 104, memory 106, power supply circuitry 116, or the like) of the processing device 100. For example, FIG. 3 shows that the optimized overclocking parameters 318 are applied to one or more of the clock(s) (e.g., CPU clock, GPU clock, APU clock, memory clock, or the like) generated by the clock generation unit(s) 114, the power supplied by the power supply circuitry 116, the cooling solution provided by the cooling system 118, or the like. In at least some implementations, the kernel mode driver and the firmware of the processor software interface 308 applies the optimized overclocking parameters 318 for processing units, such as the GPU 104.

In at least some implementations, the automated OC system 120 performs one or more of the processes described herein (e.g., obtaining the system information 303, training one or more models 422 (FIG. 4), using the models 422 to determine one or more overclocking parameters, and the like) in response to receiving a request from a user to perform automated overclocking or in response detecting one or more specified events. For example, if the automated OC system 120 detects an event (e.g., loading a new game, changing levels within a game, changing display resolution, or the like) that changes the configuration of the processing device 100, the automated OC system 120 dynamically reconfigures one or more overclocking parameters 318, such as clock rates, for the processing device 100.

Figure 4:
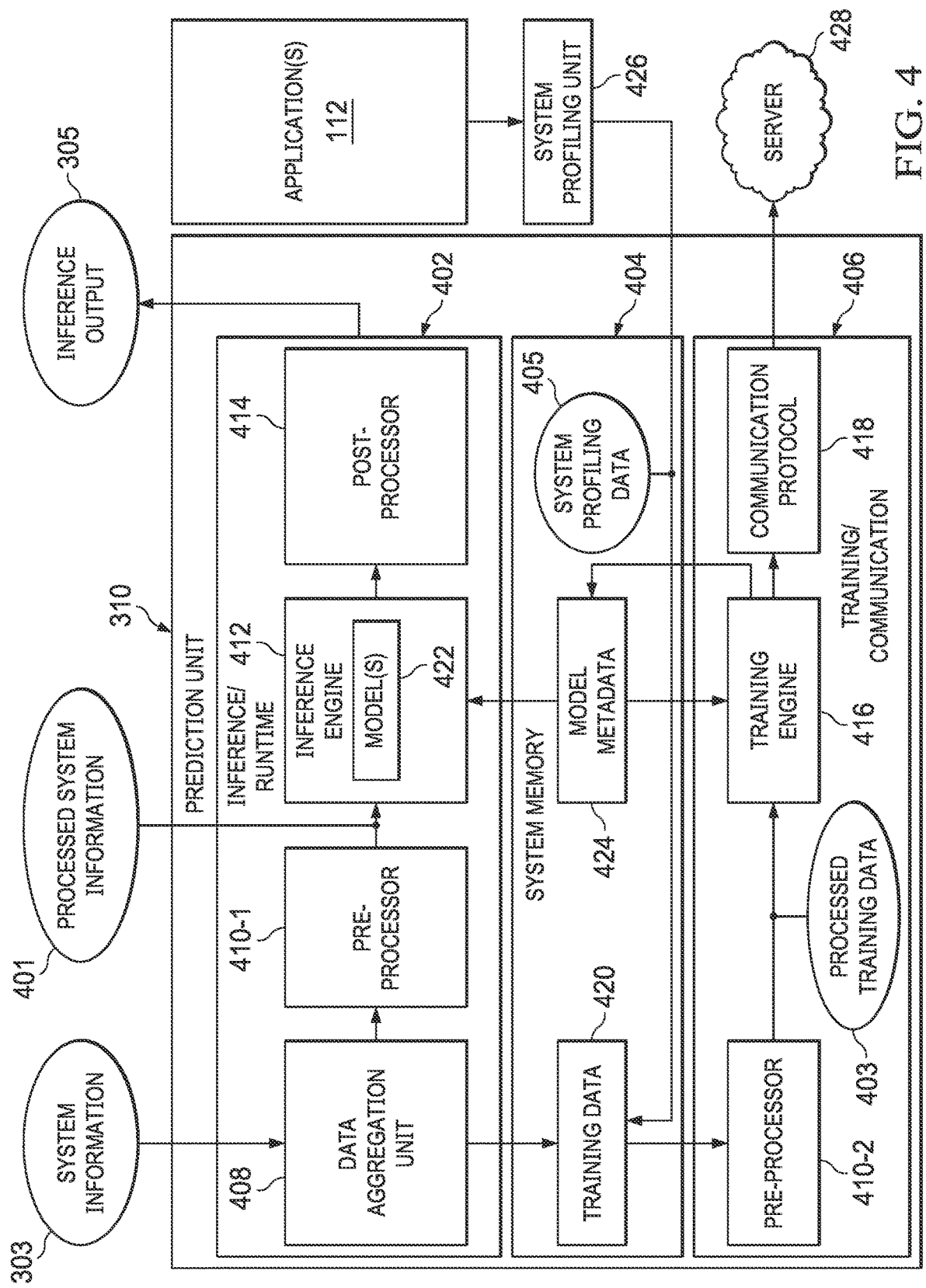
FIG. 4 is a block diagram illustrating a more detailed view of a prediction unit from the automated overclocking system of FIG. 3 in accordance with some implementations.

FIG. 4 illustrates a more detailed view of the prediction unit 310. In the example shown in FIG. 4, the prediction unit 310 includes an inference/runtime pipeline 402, at least a portion 404 of the system memory 106, and a training/communication pipeline 406. The inference/runtime pipeline 402 includes a data aggregation unit 408, a pre-processor 410 (illustrated as pre-processor 410-1), an inference engine 412 and a post processor 414. The training/communication pipeline 406, in at least some implementations, includes a pre-processor 410 (illustrated as pre-processor 410-2), a training engine 416, and a communication protocol unit 418. It is noted that the prediction unit 310, in at least some implementations, includes other components not shown in FIG. 4 or includes components different from those shown in FIG. 4.

The data aggregation unit 408 collects and aggregates relevant information, such as the system information 303 (e.g., the system-related configurations 312, workload characteristics 314, hardware specifications 316, and the like) and the user-specified OC parameters 301, received from the processor software interface 308 that will be used by the inference engine 412. In at least some implementations, a copy of the system information 303 is stored in a portion 404 of the system memory 106 as training data 420. In at least some implementations, the user-specified OC parameters 301 is also stored as training data 420 as well. The system information 303 is passed to the pre-processor 410-1. The pre-processor 410-1 receives the system information 303 and performs one or more pre-processing operations to output a representation of the system information 303 (illustrated as processed system information 401) that is consumable by the inference engine 412. For example, the pre-processor 410-1 performs one-hot encoding of categorial features, normalizes floating point values by some empirical mean and standard deviation, a combination thereof, or the like. In at least some implementations, the user-specified OC parameters 301 is also passed to the pre-processor 410-1 and stored as part of the processed system information 401.

The inference engine 412, in at least some implementations, is an artificial intelligence engine that implements one or more machine learning based models 422 (also referred to herein as trained models 422). In at least some implementations, the inference engine 412 is implemented as hardware, separate fixed-function circuitry, firmware, software operating on the processor 302 or another processor, or any combination thereof. As described below, the machine learning model(s) 422 is trained to determine one or more overclocking parameters 318 that are optimized for the processing device 100. In at least some implementations, the inference engine 412 takes as input the processed system information 401 (also referred to herein as inference engine input 401). However, in other implementations, the inference engine 412 takes the unprocessed system information 303 as input. In at least some implementations, the inference engine 412 also takes model metadata 424 as input. The model metadata 424 includes a model architecture(s), learned weights, any runtime settings, and the like for one or more machine learning models 422 implemented by the inference engine 412. The model metadata 424 includes information used by the inference engine 412 for both local function fitting (e.g., fine-tuning a neural network) and local inference.

In at least some implementations, the model metadata 424 is generated/determined based on a training process performed by the training engine 416. For example, the training engine 416 takes as input the training data 420 stored in the portion 404 of the system memory 106. It should be understood that although FIG. 4 shows the training data 420 as being stored in a portion 404 of the system memory 106, in other implementations, at least a portion of the training data 420 is stored in another location on the processing device 100, in a location remote from the processing device 100, a combination thereof, or the like. The training data 420, in at least some implementations, includes one or more instances of system information 303 received from the processor software interface 308 at different points in time. In at least some implementations, the training data 420 also includes system profiling data 405 obtained by a system profiling unit 426. In at least some implementations, the system profiling data 405 is dynamic lower-level data (e.g., compute unit utilization, bandwidth utilization, cache behavior, and the like) that is dependent on the application executing on the processing device 100 and is not necessarily deterministic. For example, as one or more application 112 execute on the processing device 100, the system profiling unit 426 collects information about the processing device 100, the hardware configurations (e.g., GPU, CPU, etc.), and the application itself and stores this system profiling data 405 as part of the training data 420. In at least some implementations, the training data 420 also includes the user-specified OC parameters 301. The training data 420, in at least some implementations, is processed by the pre-processor 410-2 prior to being received by the training engine 416. For example, the pre-processor 410-2 performs one or more pre-processing operations to output a representation of the system information 303 (illustrated as processed training data 403) that is consumable by the training engine 416. In one example, the pre-processor 410-1 performs one-hot encoding of categorial features, normalizes floating point values by some empirical mean and standard deviation, a combination thereof, or the like.

The training engine 416 takes as input the processed training data 403 (or unprocessed training data 420) and current model metadata 424 and proceeds to fine-tune the current model metadata 424 based on the processed training data 403 (e.g., local data) using one or more machine learning techniques. In at least some implementations, at least part of training or fine-tuning the model metadata 424 includes performing one or machine learning techniques, such as supervised learning, unsupervised learning, reinforcement learning, semi-supervised learning, self-supervised learning, multi-instance learning, statistical inference (e.g., inductive learning, deductive inference, transductive learning, and the like), multi-task learning, active learning, online learning, transfer learning, ensemble learning, or the like to configure the model(s) 422 for training/configuring the models 422 and determining the overclocking parameters 318. During the training process, the model 422 being trained learns one or more overclocking parameters (clocks, power budget, cooling system settings, a combination thereof, or the like) for one or more components (e.g., processing units, memory, cooling systems, and the like) of the processing device 100. The model 422, in at least some implementations, also learns how adjusting the overclocking parameters affects performance of the processing device 100 and individual components given the state of the processing device 100 represented by the training data 420, if given overclocking parameters cause system failures or instabilities, if given overclocking parameters increase or decrease the likelihood of system failures or instabilities, and the like.

For example, in a configuration where the training engine 416 implements supervised learning to learn parameters for overclocking the clock rate of the GPU 104, the model 422 being trained takes the system information 303 from the training data 420 as input and learns the clock rate that maximizes performance of the GPU 104 given the current state of the processing device 100 as represented by the system information 303. In at least some implementations, the model 422 learns the clock rate that balances performance with system stability, the clock rate that maximizes the performance-per-watt of the processing device 100, or the clock rate that satisfies some other criteria. In another example of supervised learning, the model 422 being trained takes the system information 303 from the training data 420 and a user-defined GPU clock rate as input and learns probability of failure (e.g., TDR or system crash) for the user-defined GPU clock rate. In an example where the training engine 416 implements reinforcement learning to learn parameters for overclocking the clock rate of the GPU 104, the models implements a reward based on, for example, a measure of correctness to guide the model 422 on learning the overclocking parameters for the GPU 104. For example, the model 422 takes the system information 303 from the training data 420 as input and outputs an overclocked clock rate for the GPU 104 along with a reward that combines, for example, the achieved peak frame rate with an indication of whether the overclocked clock rate resulted in a failure (e.g., TDR or system crash). The reward is then fed back into the model 422 and the model metadata 424 adjusted accordingly. After the training and fine-tuning is complete for the model 422, the resulting model metadata 424 is then stored back into the portion 404 of system memory 106 to overwrite the previous model metadata 424.

In at least some implementations, the training engine 416 generates multiple different sets of model metadata 424. In these implementations, the training engine 416 trains multiple models 422 for each of a plurality of different configurations of the processing device 100 and stores their resulting model metadata 424 in the portion 404 of system memory 106. For example, the training engine 416 trains a first model 422 for a first configuration of the processing device 100 in which the processing device 100 has a specified CPU and GPU, a set of graphics settings, and an executing application. The training engine 416 then stores the resulting model metadata 424 associated with the first trained model 422. The training engine 416 also trains a second model 422 for a second configuration of the processing device 100 in which the processing device 100 has the specified CPU and GPU, a different set of graphics settings, and a different executing application. The training engine 416 then stores the resulting model metadata 424 associated with the second trained model 422. As such, the inference engine 412 is able to implement different models 422 having different model metadata 424 depending on the current state of the processing device 100.

In at least some implementations, the model metadata 424 of a trained model 422 is sent to a remote information processing system (e.g., a server 428) for centralized or federated learning. For example, the communication protocol unit 418 sends the fine-tuned model metadata 424 and training data 420 to a server 428 for centralized learning. In another example, the communication protocol unit 418 sends only the fine-tuned model metadata 424 to the server 428 for federated learning. The server 428, in at least some implementations, sends updated model metadata back to the processing device 100 and the prediction unit 310 stores the received model metadata as the current model metadata 424 in the portion 404 of the system memory 106.

As indicated above, the inference engine 412, in at least some implementations, takes the processed system information 401 and the model metadata 424 as input. The inference engine 412 uses the model metadata 424 to configure a corresponding model 422 for locally performing inference on the processed system information 401 using a runtime engine. For example, the inference engine 412 configures the one or more models 422 using the model metadata 424, and inputs the processed system information 401 into the configured model(s) 422. In at least some implementations, the inference engine 412 implements different models 422 that have been trained for different configurations of the processing device 100, different user-specified OC parameters 301 (e.g., user-selected conservative overclocking domain, user-selected aggressive overclocking domain, stability optimized overclocking, power optimized overclocking, performance optimized overclocking, performance-per-watt optimized overclocking, and the like), and the like. The model(s) 422 performs one or more inference operations on the processed system information 401 and generates an inference output 305, such as one or more overclocking parameters 318 (e.g., clocks, power budget, cooling system settings, a combination thereof, or the like) for at least one component of the processing device 100. The one or more overclocking parameters 318 are referred to herein as being "optimized" for the processing device 100 because the one or more models 422 implemented by the inference engine 412 have been trained based on specific characteristics of the processing device 100, such as system-related configurations 312 of the processing device 100, workload characteristics 314 of the device, hardware specifications 316 of the device, and the like. The processor 302 or an execution unit (not shown) of the automated OC system 120 receives and applies the one or more overclocking parameters 318, as described above with respect to FIG. 3. In at least some implementations, the processor 302 or another processor local to or remote from the processing device 100 is the execution unit of the automated OC system 120. In other implementations, the execution unit is fixed-function circuitry implemented at the processing device 100, firmware implemented at the processing device 100, or software executing on the processor 302 or another processor local to or remote from the processing device 100.

Figure 5:
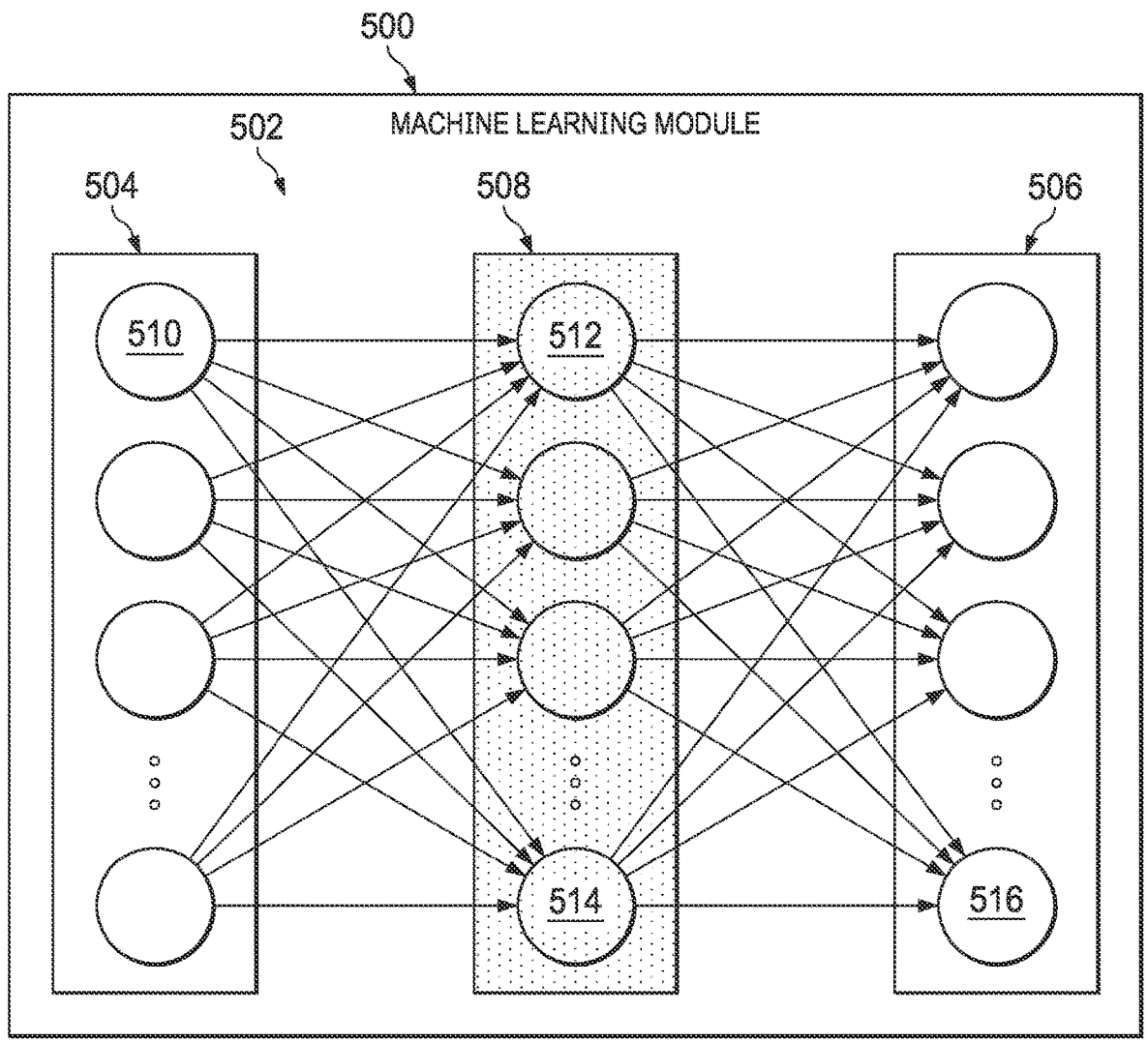
FIG. 5 is a diagram illustrating a machine learning (ML) module employing a neural network for use in an automated overclocking neural network architecture implemented by the automated overclocking system of FIG. 3 in accordance with some implementations.

As described above, the automated OC system 120 performs one or more machine learning operations. As such, in at least some implementations, one or more components of the automated OC system 120 are machine learning (ML) modules or include a ML module(s) that implement a neural network. FIG. 5 shows one example of an ML module 500 capable of being implemented as or by one or more components of the automated OC system 120, such as the prediction unit 310. The ML module 500, in at least some configurations, implements one or more deep neural networks (DNNs) or other neural networks for determining overclocking parameters 318 that are optimized for the system configuration, workload characteristics, hardware specifications, user provided criteria/parameters 301, a combination thereof, or the like of the processing device 100. The ML module 500, therefore, illustrates an example module for implementing one or more of these neural networks.

In the depicted example, the ML module 500 implements at least one deep neural network (DNN) 502 with groups of connected nodes (e.g., neurons and/or perceptrons) organized into three or more layers. The nodes between layers are configurable in a variety of ways, such as a partially connected configuration where a first subset of nodes in a first layer is connected with a second subset of nodes in a second layer, a fully connected configuration where each node in a first layer is connected to each node in a second layer, etc. A neuron processes input data to produce a continuous output value, such as any real number between 0 and 1. In some cases, the output value indicates how close the input data is to a desired category. A perceptron performs linear classifications on the input data, such as a binary classification. The nodes, whether neurons or perceptrons, can use a variety of algorithms to generate output information based upon adaptive learning. Using the DNN 502, the ML module 500 performs a variety of different types of analysis, including single linear regression, multiple linear regression, logistic regression, stepwise regression, binary classification, multiclass classification, multivariate adaptive regression splines, locally estimated scatterplot smoothing, a combination thereof, and so forth.

In some implementations, the ML module 500 adaptively learns based on supervised learning. In supervised learning, the ML module 500 receives various types of input data as training data, such as the training data 420 of FIG. 4. The ML module 500 processes the training data to learn how to map the input to a desired output. As one example, the ML module 500 receives one or more of system-related configurations 312 for the processing device 100, workload characteristics 314 of the processing device 100, hardware specifications 316 of the processing device 100, user-specified overclocking parameters/criteria 301, a combination thereof, or the like as input and learns how to map this input training data to, for example, one or more overclocking parameters 318.

During a training procedure, the ML module 500 uses labeled or known data as an input to the DNN 502. The DNN 502 analyzes the input using the nodes and generates a corresponding output. The ML module 500 compares the corresponding output to truth data and adapts the algorithms implemented by the nodes to improve the accuracy of the output data. Afterward, the DNN 502 applies the adapted algorithms to unlabeled input data to generate corresponding output data. The ML module 500 uses one or both of statistical analysis and adaptive learning to map an input to an output. For instance, the ML module 500 uses characteristics learned from training data to correlate an unknown input to an output that is statistically likely within a threshold range or value. This allows the ML module 500 to receive complex input and identify a corresponding output. In some implementations, a training process trains the ML module 500 on characteristics of overclocking (e.g., CPU clock rates, GPU clock rates, APU clock rates, memory clock rates, CPU voltages, GPU voltages, APU voltages, memory voltages, component temperatures, system temperatures, cooling system settings, a combination thereof, or the like). This allows the trained ML module 500 to receive input data specific to the processing device 100 (e.g. system-related configurations 312, workload characteristics 314, hardware specifications 316, and user-specified OC parameters 301) and determine overclocking parameters 318 that are optimized for the current or expected state of the processing device 100.

In the depicted example, the DNN 502 includes an input layer 504, an output layer 506, and one or more hidden layers 508 positioned between the input layer 504 and the output layer 506. Each layer has an arbitrary number of nodes, where the number of nodes between layers can be the same or different. That is, the input layer 504 can have the same number and/or a different number of nodes as output layer 506, the output layer 506 can have the same number and/or a different number of nodes than the one or more hidden layer 508, and so forth.

Node 510 corresponds to one of several nodes included in input layer 504, wherein the nodes perform separate, independent computations. As further described, a node receives input data and processes the input data using one or more algorithms to produce output data. Typically, the algorithms include weights and/or coefficients that change based on adaptive learning. Thus, the weights and/or coefficients reflect information learned by the neural network. Each node can, in some cases, determine whether to pass the processed input data to one or more next nodes. To illustrate, after processing input data, node 510 can determine whether to pass the processed input data to one or both of node 512 and node 514 of hidden layer 508. Alternatively or additionally, node 510 passes the processed input data to nodes based upon a layer connection architecture. This process can repeat throughout multiple layers until the DNN 502 generates an output using the nodes (e.g., node 516) of output layer 506.

A neural network can also employ a variety of architectures that determine what nodes within the neural network are connected, how data is advanced and/or retained in the neural network, what weights and coefficients the neural network is to use for processing the input data, how the data is processed, and so forth. These various factors collectively describe a neural network architecture configuration, such as the neural network architecture configurations briefly described above. To illustrate, a recurrent neural network, such as a long short-term memory (LSTM) neural network, forms cycles between node connections to retain information from a previous portion of an input data sequence. The recurrent neural network then uses the retained information for a subsequent portion of the input data sequence. As another example, a feed-forward neural network passes information to forward connections without forming cycles to retain information. While described in the context of node connections, it is to be appreciated that a neural network architecture configuration can include a variety of parameter configurations that influence how the DNN 502 or other neural network processes input data.

A neural network architecture configuration of a neural network can be characterized by various architecture and/or parameter configurations. To illustrate, consider an example in which the DNN 502 implements a convolutional neural network (CNN). Generally, a convolutional neural network corresponds to a type of DNN in which the layers process data using convolutional operations to filter the input data. Accordingly, the CNN architecture configuration can be characterized by, for example, pooling parameter(s), kernel parameter(s), weights, and/or layer parameter(s).

A pooling parameter corresponds to a parameter that specifies pooling layers within the convolutional neural network that reduce the dimensions of the input data. To illustrate, a pooling layer can combine the output of nodes at a first layer into a node input at a second layer. Alternatively or additionally, the pooling parameter specifies how and where in the layers of data processing the neural network pools data. A pooling parameter that indicates "max pooling," for instance, configures the neural network to pool by selecting a maximum value from the grouping of data generated by the nodes of a first layer and use the maximum value as the input into the single node of a second layer. A pooling parameter that indicates "average pooling" configures the neural network to generate an average value from the grouping of data generated by the nodes of the first layer and uses the average value as the input to the single node of the second layer.

A kernel parameter indicates a filter size (e.g., a width and a height) to use in processing input data. Alternatively or additionally, the kernel parameter specifies a type of kernel method used in filtering and processing the input data. A support vector machine, for instance, corresponds to a kernel method that uses regression analysis to identify and/or classify data. Other types of kernel methods include Gaussian processes, canonical correlation analysis, spectral clustering methods, and so forth. Accordingly, the kernel parameter can indicate a filter size and/or a type of kernel method to apply in the neural network. Weight parameters specify weights and biases used by the algorithms within the nodes to classify input data. In some implementations, the weights and biases are learned parameter configurations, such as parameter configurations generated from training data. A layer parameter specifies layer connections and/or layer types, such as a fully-connected layer type that indicates to connect every node in a first layer (e.g., output layer 506) to every node in a second layer (e.g., hidden layer 508), a partially-connected layer type that indicates which nodes in the first layer to disconnect from the second layer, an activation layer type that indicates which filters and/or layers to activate within the neural network, and so forth. Alternatively or additionally, the layer parameter specifies types of node layers, such as a normalization layer type, a convolutional layer type, a pooling layer type, and the like.

While described in the context of pooling parameters, kernel parameters, weight parameters, and layer parameters, it will be appreciated that other parameter configurations can be used to form a DNN consistent with the guidelines provided herein. Accordingly, a neural network architecture configuration can include any suitable type of configuration parameter that a DNN can apply that influences how the DNN processes input data to generate output data.

The architectural configuration of the ML module 500, in at least some implementations, is based on the current state of the processing device 100 including the current system configuration, workload(s), hardware specifications, user-specified OC parameters 301, a combination thereof, or the like of the processing device 100. For example, in a first configuration, the processing device 100 operates with a specified CPU clock rate, a specified GPU clock rate, a specified memory clock rate, a specified CPU voltage, a specified GPU voltage, a specified set of display settings, a specified set of cooling settings, one or more executing applications, a specific CPU model, a specific GPU model, a specified amount of random access memory (RAM), and the like. Thus, in this example, the ML module 500 is trained based on this first configuration of the processing device 100. However, other configurations of the processing device 100 are possible as well. For example, in a second configuration, the user may have changed the GPU model, different applications may be executing, the temperature of the processing device 100 has changed, or the like. Thus, in this example, the ML module 500 is also trained based on one or more other configurations of the processing device 100, such as the second configuration. Accordingly, in some implementations, the ML module 500 is configured to implement different neural network architecture configurations for different combinations of system-related configurations 312, workload characteristics 314, hardware specifications 316, or the like. For example, the processing device 100 has access to one or more neural network architectural configurations for use depending on the current state of the processing device 100 relating to one or more of the system configuration, workload(s), hardware specification, or the like.

In at least some implementations, the device implementing the ML module 500 locally stores some or all of a set of candidate neural network architectural configurations that the ML module 500 can employ. For example, a component of the automated OC system 120 can index the candidate neural network architectural configurations by a look-up table (LUT) or other data structure that takes as inputs one or more parameters, such as one or more system-related configurations of the processing device 100, workload characteristics of the processing device 100, hardware specifications of the processing device 100, a combination thereof, or the like, and outputs an identifier associated with a corresponding locally-stored candidate neural network architectural configuration that is suited for operation in view of the input parameter(s). As such, the ML module 500 allows components of the automated OC system 120, such as the prediction unit 310, to perform one or more machine learning operations for determining one or more overclocking parameters that are optimized for the processing device 100.

Figure 6:
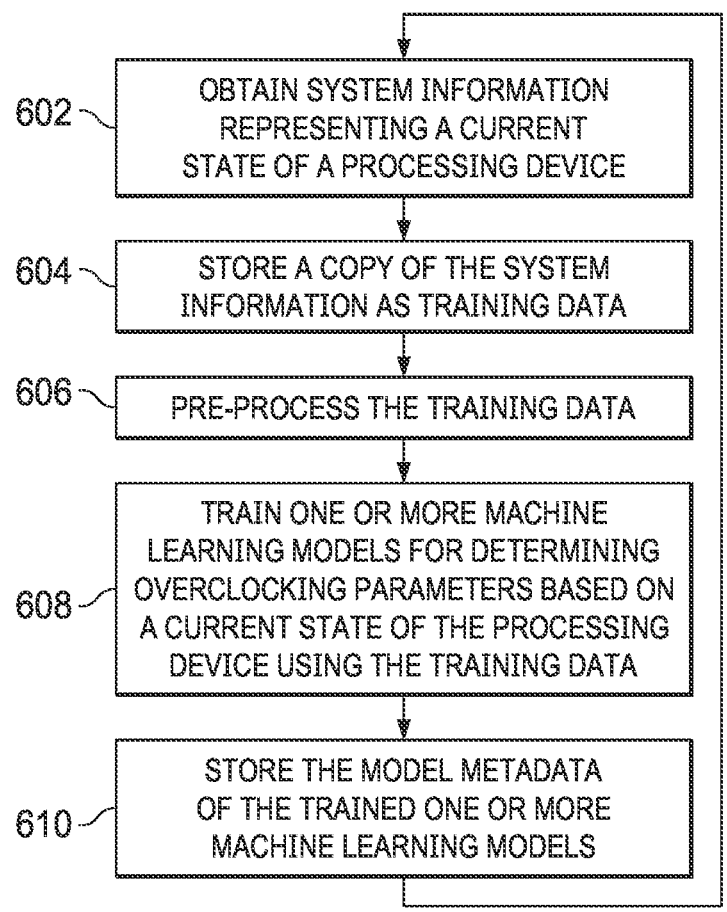
FIG. 6 is a flow diagram illustrating a method for training one or more machine learning models implemented by the automated overclocking system of FIG. 3 to determine overclocking parameters for a current or expected configuration of a processing device in accordance with some implementations.

FIG. 6 illustrates a flow diagram of a method 600 for training one or more machine learning models 422 to determine overclocking parameters for a current or expected configuration of a processing device 100. It should be understood the processes described below with respect to method 600 have been described above in greater detail with reference to FIG. 2 to FIG. 5. For purposes of description, the method 600 is described with respect to an example implementation at the processing device 100 of FIG. 1, but it will be appreciated that, in other implementations, the method 600 is implemented at processing systems having different configurations. Also, the method 600 is not limited to the sequence of operations shown in FIG. 6, as at least some of the operations can be performed in parallel or in a different sequence. Moreover, in at least some implementations, the method 600 can include one or more different operations that those shown in FIG. 6.

At block 602, the automated OC system 120 obtains system information 303 representing a current state of a processing device 100. For example, the system information 303 includes one or more of system-related configurations 312, workload characteristics 314, hardware specifications 316 of the processing device 100. In at least some implementations, at least part of the system information 303 is obtained by a system profiling unit 426 as described above with respect to FIG. 4. At block 604, a data aggregation unit 408 (or another component) of the automated OC system 120 stores a copy of the system information 303 in memory 106 as training data 420.

At block 606, a pre-processor 410-2 of the automated OC system 120 performs one or more pre-processing operations on the training data 420 to output a representation of the training data 420 that is consumable by a training engine 416 of the automated OC system 120. In at least some implementations, the training data 420 is not pre-processed. At block 608, the training engine 416 uses the training data 420 to train one or more machine learning models 422 for determining overclocking parameters 318 based on a current state of the processing device 100. In at least some implementations, the training data 420 also includes user-specified OC parameters 301, such as user request for overclocking one or more components of the processing device in a conservative overclocking domain or an aggressive overclocking domain. At block 610, the training engine 416 stores the model metadata of the trained model 422 in, for example, a portion 404 of system memory 106. The method 600 can then exit or return to block 602 for training additional models 422 or update previously trained models 422.

Figure 7:
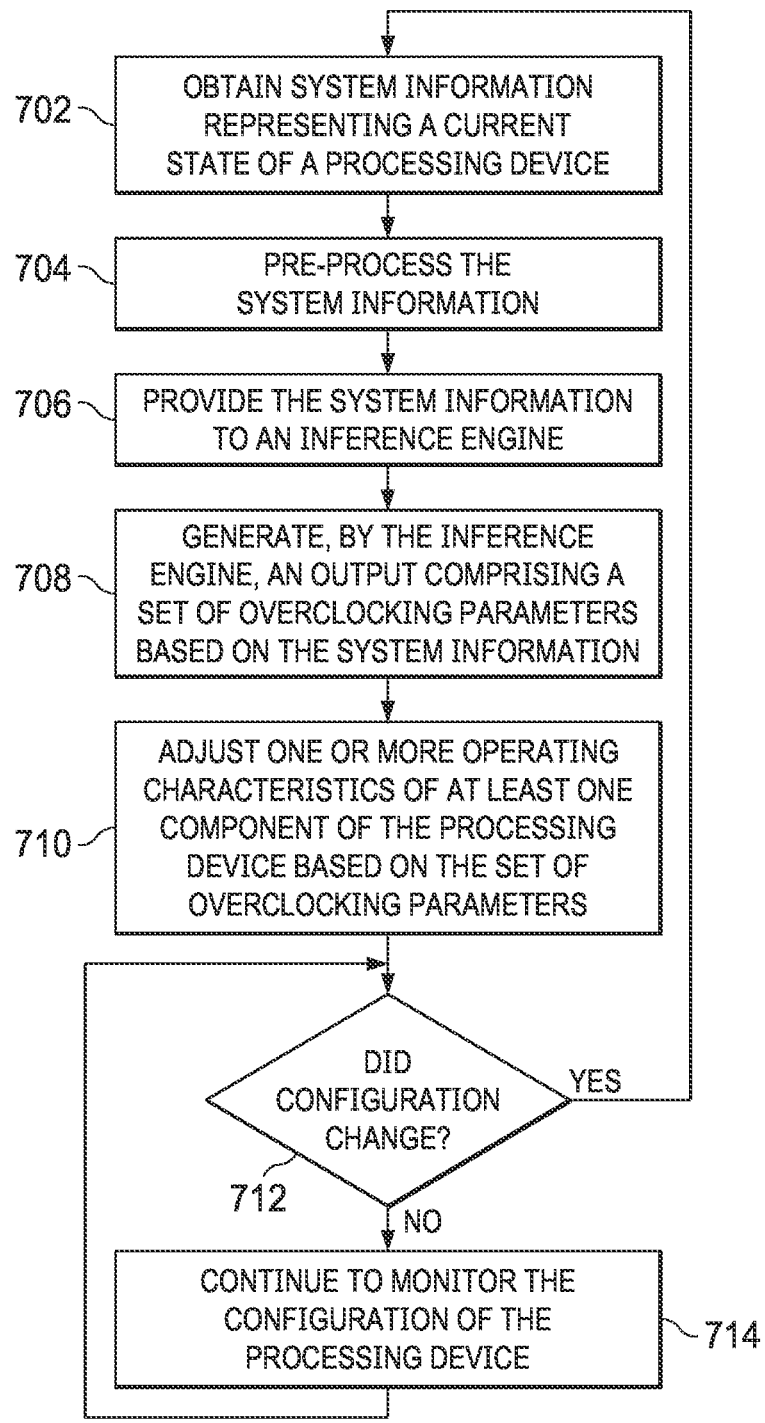
FIG. 7 is a flow diagram illustrating a method for performing automated overclocking of a processing device based on a current or expected configuration of the processing device in accordance with some implementations.

FIG. 7 illustrates a flow diagram of a method 700 for performing automated overclocking of a processing device 100 according to one or more of the techniques described herein. It should be understood the processes described below with respect to method 700 have been described above in greater detail with reference to FIG. 2 to FIG. 5. For purposes of description, the method 700 is described with respect to an example implementation at the processing device 100 of FIG. 1, but it will be appreciated that, in other implementations, the method 700 is implemented at processing systems having different configurations. Also, the method 700 is not limited to the sequence of operations shown in FIG. 7, as at least some of the operations can be performed in parallel or in a different sequence. Moreover, in at least some implementations, the method 700 can include one or more different operations that those shown in FIG. 7.

At block 702, the automated OC system 120 obtains system information 303 representing a current state of a processing device 100. For example, the system information 303 includes one or more of system-related configurations 312, workload characteristics 314, hardware specifications 316 of the processing device 100. In at least some implementations, at least part of the system information 303 is obtained by a system profiling unit 426 as described above with respect to FIG. 4. The automated OC system 120, in at least some implementations, receives user-specified OC parameters 301 in addition to the system information 303. For example, the automated OC system 120 a graphical user interface 304 associated with the automated OC system 120 is presented to a user of the processing device 100. The user is able to provide user-specified OC parameters 301 through the graphical user interface 304, such as user-selected conservative overclocking domain, user-selected aggressive overclocking domain, stability optimized overclocking, power optimized overclocking, performance optimized overclocking, performance-per-watt optimized overclocking, and the like.

At block 704, a pre-processor 410-1 of the automated OC system 120 performs one or more pre-processing operations on the system information 303 to output a representation of the system information 303 that is consumable by an inference engine 412 of the automated OC system 120. In at least some implementations, the system information 303 is not pre-processed. At block 706, the inference engine 412 receives as input the system information 303 representing the current configuration of the processing device. In at least some implementations, the inference engine 412 also receives the user-specified OC parameters 301 as input. At block 708, the inference engine 412 generates an output 305 comprising a set of overclocking parameters 318 (e.g., clock rate settings, power settings, thermal management settings, memory settings, a combination thereof, or the like) associated with the at least one component based on the system information 303 (and the user-specified OC parameters 301 if received as input). For example, the inference engine 412, in at least some implementations, implements a machine learning model 422 that takes the system information (and user-specified OC parameters 301 if available) as input and outputs the set of overclocking parameters 318 based thereon. The inference engine 412, in at least some implementations, configures a neural network represented by the model 422 based on the input received by the inference engine 412. In another example, the inference engine 412 selects a model 422 (or model metadata 424) based on at least one of the system information 303 or user-specified OC parameters 301. The inference engine 412 then implements the selected model 422 or configures a model 422 based on the selected model metadata 424.

At block 710, the automated OC system 120 or processor 302 adjusts one or more operating characteristics (e.g., clock rates, power/voltage, thermal/cooling settings, or the like) of the at least one component of the processing device 100 based on the set of the set of overclocking parameters 318. At block 712, the automated OC system 120 determines if the current configuration of the processing device 100 has changed. For example, the automated OC system 120 monitors the system information 303 for any changes. If the current configuration of the processing device 100 has not changed, the automated OC system 120 continues to monitor the current configuration for any changes. If the current configuration of the processing device 100 has changed, the method returns to block 702 where system information 303 representing the new configuration of the processing device 100 is processed. The processes described above with respect to blocks 704 to 710 are then repeated for the new configuration such that a new set of overclocking parameters 318 are determined at block 708, and one or more operating characteristics of the at least one component are adjusted at block 710 based on the new set of overclocking parameters 318.

In some implementations, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method, at a processing device, comprising:
   generating, by an inference engine, a first output based on a current configuration and workload information of the processing device, the first output comprising a first set of overclocking parameters; and
   adjusting one or more operating characteristics of at least one component of the processing device based on the first set of overclocking parameters.

2. The method of claim 1, wherein generating the first output comprises:
   providing an input to the inference engine representing the current configuration of the processing device, the input comprising one or more of system-related configuration information or hardware specifications for the processing device; and
   inferring the first set of overclocking parameters based on the input.

3. The method of claim 1, wherein the first set of overclocking parameters indicate one or more clock rate settings, power settings, thermal management settings, or memory settings associated with the at least one component.

4. The method of claim 1, further comprising:
   determining that the current configuration of the processing device has changed to a different configuration;
   generating, by the inference engine, a second output based on the different configuration, the second output comprising a second set of overclocking parameters different from the first set of overclocking parameters; and
   adjusting the one or more operating characteristics of the at least one component of the processing device based on the second set of overclocking parameters.

5. The method of claim 1, wherein generating the first output comprises:
   configuring a neural network executed by the inference engine based on the current configuration of the processing device; and
   generating, by the neural network, the first output.

6. The method of claim 1, further comprising:
   training at least one machine learning model to determine overclocking parameters for at least one configuration of the processing device.

7. The method of claim 6, wherein training the at least one machine learning model comprises:
   training the at least one machine learning model based on one or more of system-related configurations information of the processing device, workload characteristic information for the processing device, or hardware specifications for the processing device.

8. The method of claim 6, wherein generating the first output comprises:

providing the current configuration of the processing device as an input to the trained at least one machine learning model; and responsive to the providing the current configuration of the processing device as the input, generating, by the trained at least one machine learning model, the first output.

9. A method, at a processing device, comprising:

receiving one or more user-specified overclocking parameters through a graphical user interface;

generating, by an inference engine, a first output based on the one or more user-specified overclocking parameters and a current configuration of the processing device, the first output comprising a first set of overclocking parameters; and adjusting one or more operating characteristics of at least one component of the processing device based on the first set of overclocking parameters.

10. The method of claim 9, further comprising:

selecting a machine learning model based on at least one of the one or more user-specified overclocking parameters or the current configuration of the processing device; and configuring the inference engine based on the selected machine learning model.

11. The method of claim 9, wherein the one or more user-specified overclocking parameters configure the inference engine to determine overclocking parameters within a conservative overclocking domain or overclocking parameters within an aggressive overclocking domain, wherein the overclocking parameters within the aggressive overclocking domain increase performance of the at least one component while increasing a risk of a system failure or system instability compared to the overclocking parameters within the conservative overclocking domain.

12. The method of claim 9, wherein generating the first output comprises:

providing an input to the inference engine representing the current configuration of the processing device, the input comprising one or more of system-related configuration information, workload characteristic information, or hardware specifications for the processing device; and inferring the first set of overclocking parameters based on the input.

13. The method of claim 9, further comprising:

determining that the current configuration of the processing device has changed to a different configuration;

generating, by the inference engine, a second output based on the one or more user-specified overclocking parameters and the different configuration, the second output comprising a second set of overclocking parameters different from the first set of overclocking parameters; and adjusting the one or more operating characteristics of the at least one component of the processing device based on the second set of overclocking parameters.

14. The method of claim 9, wherein generating the first output comprises:

configuring a neural network executed by the inference engine based on overclocking parameters and the current configuration of the processing device; and generating, by the neural network, the first output.

15. A processing device comprising: a processor; and an automated overclocking system, wherein the automated overclocking system includes an inference engine configured to generate a first output based on a current configuration and workload information of the processing device, the first output comprising a first set of overclocking parameters; and an execution unit configured to adjust one or more operating characteristics of at least one component of the processing device based on the first set of overclocking parameters.

16. The processing device of claim 15, wherein the inference engine is configured to generate the first output by:

providing an input to a machine learning model, the input representing the current configuration of the processing device and comprising one or more of system-related configuration information or hardware specifications for the processing device; and inferring, using the machine learning model, the first set of overclocking parameters based on the input.

17. The processing device of claim 15, wherein the inference engine is further configured to:

determine that the current configuration of the processing device has changed to a different configuration; and generate a second output based on the different configuration, the second output comprising a second set of overclocking parameters different from the first set of overclocking parameters, wherein the execution unit is further configured to adjust the one or more operating characteristics of the at least one component of the processing device based on the second set of overclocking parameters.

18. The processing device of claim 15, wherein the inference engine is further configured to:

configure a neural network based on the current configuration of the processing device; and generate the first output using the configured neural network.

19. The processing device of claim 15, wherein the automated overclocking system is configured to:

present a graphical user interface to a user of the processing device; and receive one or more user-specified overclocking parameters through the graphical user interface.

20. The processing device of claim 19, wherein the inference engine is further configured to:

select a machine learning model based on at least one of the one or more user-specified overclocking parameters or the current configuration of the processing device; and generate the first output using the selected machine learning model.

* * * * *